United States Patent [19]

Johansson

[11] 4,435,209
[45] Mar. 6, 1984

[54] PROCESS FOR THE PREPARATION OF SILICON OR FERROSILICON

[75] Inventor: Thomas Johansson, Ljungaverk, Sweden

[73] Assignee: Kemanord AB, Stockholm, Sweden

[21] Appl. No.: 363,812

[22] Filed: Mar. 31, 1982

Related U.S. Application Data

[63] Continuation of Ser. No. 195,498, Oct. 9, 1980, abandoned.

[30] Foreign Application Priority Data

Oct. 24, 1979 [SE] Sweden .................. 7908821

[51] Int. Cl.³ .................. C21C 5/52; C01B 33/02
[52] U.S. Cl. .................. 75/11; 75/10 R; 420/578; 423/350
[58] Field of Search .................. 423/350; 75/10, 11, 75/123 L; 420/578

[56] References Cited

U.S. PATENT DOCUMENTS 3,704,094 11/1972 McClincy et al. .................. 423/350
3,887,359 6/1975 Enger et al. .................. 423/350
4,269,620 5/1981 Johansson .................. 423/350

FOREIGN PATENT DOCUMENTS 2922468 12/1979 Fed. Rep. of Germany ...... 423/350

*Primary Examiner*—Edward J. Meros
*Assistant Examiner*—Steven Capella
*Attorney, Agent, or Firm*—Fred Philpitt

[57] ABSTRACT

A process for the production of silicon or ferrosilicon by reduction of silicon oxide, optionally in the presence of iron or iron oxide, using a carbonaceous reducing agent, in a reduction furnace. The yield is improved without harmful temperature rises if the ratio of the amount of thermal energy supplied to the furnace to the amount of silicon oxide supplied to the furnace is made adjustable in such a manner that a value for the ratio can be set within an interval, which interval in its lower end is limited by the lowest value permitting constant reduction of the silicon monoxide and silicon directly with a certain part of the reducing agent which is supplied at the top of the furnace, because the amount of produced silicon monoxide is insufficient for complete conversion of all the carbonaceous reducing agent to silicon carbide at the top of the furnace, and in its upper end is limited by the highest value permitting constant reduction of the silicon oxide raw material to silicon monoxide and silicon directly with silicon carbide, because the amount of produced silicon monoxide is sufficient for conversion of the carbonaceous reducing agent to silicon carbide at the top of the furnace, and that a sufficient content of reducing agent is maintained in the lower, hotter, parts of the furnace so that reduction to some extent can take place directly with the reducing agent.

9 Claims, 1 Drawing Figure

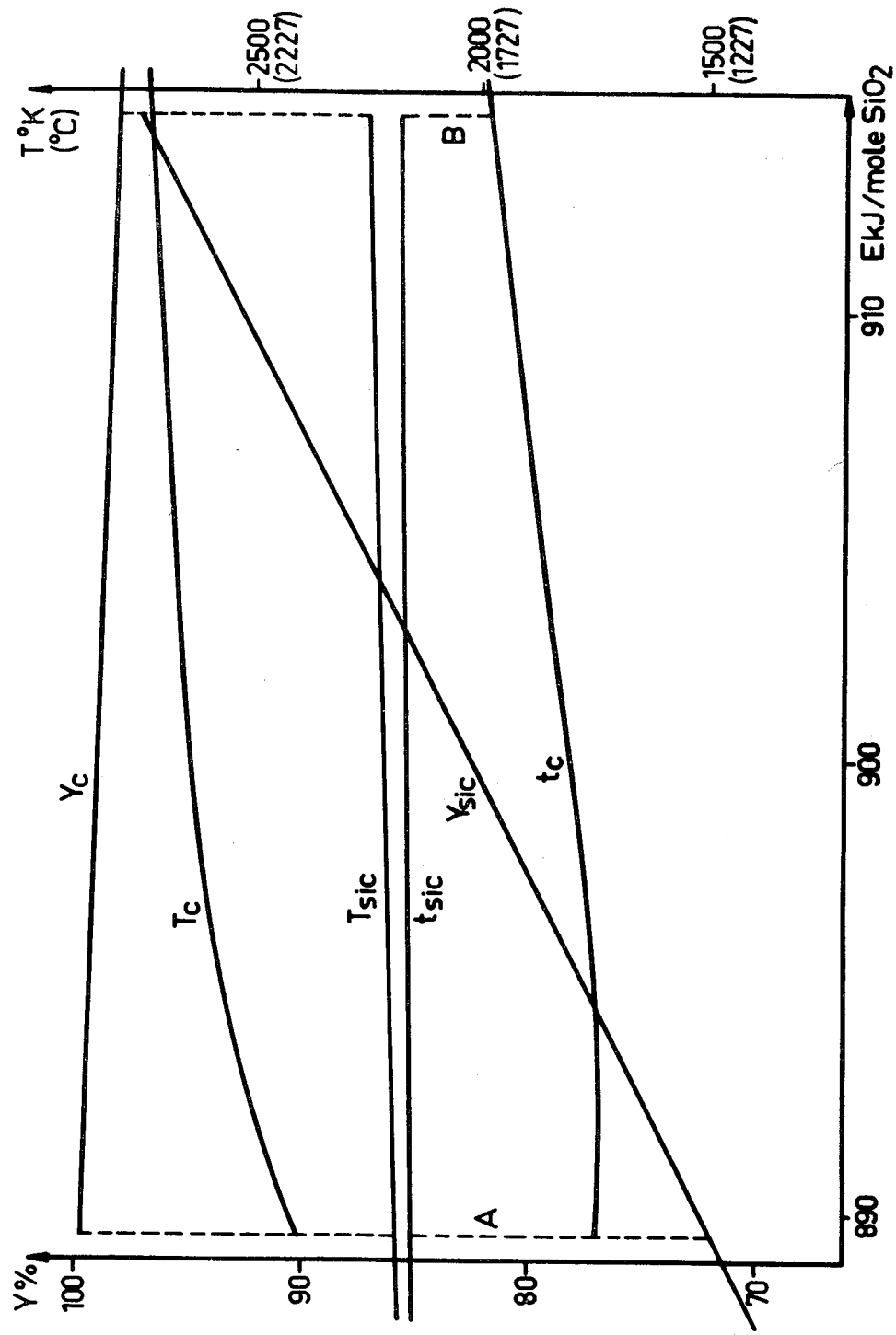

PROCESS FOR THE PREPARATION OF SILICON OR FERROSILICON

This is a continuation of application Ser. No. 195,498, filed Oct. 9, 1980, now abandoned.

This invention relates to a process for the production of silicon or ferrosilicon by reduction of silicon oxide with carbonaceous reducing agents in a reduction furnace.

The at present time predominant production method for elementary silicon or ferrosilicon, consists in charging carbon and quartz optionally with addition of iron or iron oxide into an open electric arc furnace. The materials are heated to a high temperature at the bottom of the furnace by means of electric arcs from electrodes whereby the oxides are reduced by the carbon and form a melt of silicon or ferrosilicon which can be discharged from the furnace. This method is, however, for many reasons inefficient and problematic. During the furnace process bridges of semi-molten material are formed in the charge as well as blow holes through which gas losses occur. The charge must therefore be stirred and worked regularly, and this must because of the heat be done intermittently and by use of devices outside the furnace. As a consequence of this the furnace cannot be closed, which results in heat and gas losses and thus small possibilities of closing the process with respect to energy and efficiently limiting environmental problems. Moreover, the furnace process is difficult to control and formation of silicon carbide in the furnace and waste of unreacted silicon monoxide cannot be completely prevented and this results in a utilization of raw materials and energy of at most 80 to 90 percent. The purity of the product is not particularly good and, moreover, varying and very dependent on the raw materials used.

The attempts to overcome these problems which have been made so far have not been successful. Changes of process variables, such as charging rates, power supply or the ratio of charged carbon to quartz, have only been able to influence furnace process and yield marginally.

The Swedish patent Nos. 220 338 and 363 084 disclose especially adapted charging material prepared in order to attempt to influence the furnace process in this way. The methods have given a certain improvement of the furnace process but have only been able to influence the yield marginally.

It is further known from the Swedish patent No. 382 042 to charge carbon and quartz separately to the furnace and to keep these materials separated in different parts of the furnace. In this way the need of stirring in the furnace can be reduced, but also in this case the efficiency of the process and the problems associated with it can only be influenced to a small extent.

Owing to the difficulties in improving the conventional process substantially, attempts have also been made to find new ways of preparing silicon. These comprise trials with new reducing agents such as hydrogen and metals or processes via the halogen compounds of the silicon, but these methods have not yet led to a commercial realization, and with respect to the great capital invested in plants for production of silicon in a conventional manner there is a need of improving this process in the first place.

The present invention is based on analysis of the reaction pattern in a silicon reduction furnace, whereby new means of influencing the furnace process have been found.

The reaction in a silicon reduction furnace is based on the following overall reaction formula:

$$SiO_2 + 2C \rightarrow Si + 2CO \qquad \text{I}$$

However, the actual reduction takes place via a series of intermediates and at least SiO, CO, $CO_2$, C, $C_2$, $C_3$, $C_4$, $C_5$, O, $O_2$, Si, $Si_2$, $Si_3$, $SiO_2$, $Si_2C$, $C_2Si$, N, NO and $N_2$ are present in the gas phase of the reactor in non-negligible amounts. In condensed phase at least $Si_{(l)}$, $C_{(s)}$, $SiO_2(l)$, $SiO_{2(christobalite)}$, $SiO_{2(quartz)}$ and $SiC_{(s)}$ are present in non-negligible amounts. Silicon monoxide, SiO, and silicon carbide, SiC. are the most important of the intermediates, as these are produced as by-products in the furnace, SiO leaving in gas phase at the top of the furnace while SiC is accumulated in the furnace and removed at periodical shut downs of the furnace, The following reactions, among others, lead to formation of silicon monoxide in the reactor:

$$SiO_2 + C \rightarrow SiO + CO \qquad \text{II}$$

$$2SiO_2 + SiC \rightarrow 3SiO + CO \qquad \text{III}$$

Silicon carbide is formed, inter alia, via the following reactions:

$$Si + C \rightarrow SiC \qquad \text{IV}$$

$$SiO + 2C \rightarrow SiC + CO \qquad \text{V}$$

$$2SiO + C \rightarrow SiC + SiO_2 \qquad \text{VI}$$

These intermediate products are generally necessary in order to obtain the final product, elementary silicon. Silicon can certainly be formed directly from carbon and quartz, but this generally requires very high temperatures and give minor improvements in yields, if by-products containing silicon are not, by special means, directly or indirectly, reintroduced into the reaction zone. In conventional furnaces the silicon is formed essentially by the following reactions:

$$SiO_2 + SiC \rightarrow Si + SiO + CO \qquad \text{VII}$$

$$SiC + SiO \rightarrow 2Si + CO, \qquad \text{VIII}$$

whereby part of the monoxide which reacts according to reaction VIII can be formed according to reaction II, if carbon is present. It is evident from the relationships of the reactions II, III, VII and VIII that silicon is formed by reaction between carbide, optionally also carbon, and silicon oxides, but that the proportions of the products silicon, silicon monoxide and carbon monoxide may vary, due to the reciprocal predominance of the reactions. If carbon is not present in the reaction zone, the overall reaction can thus be written $$SiO_2 + xSiC \rightarrow (2x-1)Si + (2-x)SiO + xCO, \qquad \text{IX}$$

where x theoretically may vary between 0.5 and 2. The carbide which is consumed in this reaction must be re-formed in the reactor. This takes place in the upper, cooler parts of the furnace, essentially via reactions V and VI above, as silicon and carbon will not, in a technical silicon furnace, come into contact with each other to such an extent that the reaction IV will contribute to the formation of carbide to any appreciable extent. This means that at least one mole silicon monoxide per mole silicon, corresponding to an x-value of maximum 1, must be formed in the reaction between quartz and silicon carbide and later be converted to carbide, in order that the content of carbide in the furnace will not be reduced. Besides, it is in practice difficult to achieve x-values above 1 in a silicon furnace. If x is less than 1, as it generally is, the furnace can in theory be operated in a couple of alternative ways. If all silicon that is formed is converted to carbide according to formula V, e.g. by charging a large amount of carbon per charged amount of quartz, a net production of carbide corresponding to $(1-x)$ is obtained in the furnace. This is not a satisfactory solution, as it will require regular shut downs of the furnace and removal of its contents. If, instead, a smaller amount of carbon than the stoichiometrically required one is charged, a net production of carbide can be suppressed as substantially not more than one mole of monoxide is converted to carbide, but instead there will be a waste of unreacted silicon monoxide from the top of the furnace, or there will be a conversion of the monoxide in the furnace to silicon dioxide according to formula VI above. These alternatives have also got their problems. Silicon monoxide, which leaves the furnace, reacts to silica and forms a finely divided powder, which, in addition to material losses, causes environmental hazards, if it is allowed to freely leave the furnace to the environment. The dust can be separated, but only with difficulty, owing to its finely divided nature. Attempts have been made to recirculate such dust to the furnace, the material losses then being eliminated. However, recycling will influence the furnace process unfavourably and, moreover, the energy economy of the process, which is the most burdensome part with respect to costs, is not improved since the energy required to reduce the quartz to monoxide is not recovered and this energy is almost as great as the energy for the total reduction of quartz to elementary silicon. If the excess of silicon monoxide is directly retained in the furnace by reaction VI above, e.g. by cooling the furnace top, the loss of energy would be reduced, but the precipitation of silica in the charge would instead cause the well-known problems with tackiness of the charge, which results in a reduced reaction rate of the carbon, formation of blows and bridges in the charge, electrode breaks, a great need for working the charge and need for open furnaces. The alternative ways of operating silicon furnaces as outlined above are only theoretical as the silicon monoxide in real furnaces reacts according to all the reaction ways, i.e. carbide is built up, silicon monoxide vanishes to the environment and precipitation of quartz takes place in the charge. Instead of following the ideal reaction formula I above, the reaction will follow the more general formula:

$$SiO_2 + nC \rightarrow aSi + bSiO + cSiC + (n-C)CO, \quad X$$

where a always is less than 1 and b is greater than 0. In order to avoid formation of carbide in the furnace to the greatest possible extent, a deficit of carbon relative to the amount of quartz is generally charged, approximately corresponding to a value of 1.8 for n.

All the problems mentioned above would be influenced in a favourable direction, if the furnace process could be operated in such a manner, that, in the formation of silicon, only one mole silicon monoxide was formed per mole of consumed silicon carbide, and if this silicon monoxide could then be completely converted to silicon carbide. This can be said to correspond to an ideal furnace process.

The relations between the products formed in the reaction IX for formation of silicon is dependent on the temperature, and a larger amount of silicon and a smaller amount of silicon monoxide, respectively, i.e. a higher value of x, can be obtained by increasing the reaction temperature. If carbon is present in the reaction zone, less than one mole of carbon monoxide should be formed per mole of formed silicon, but also in this case the reaction is influenced in the desired direction by raising the temperature.

In order to achieve a complete conversion of the silicon monoxide, that leaves the zone of silicon formation, to carbide according to reaction V, it is required that alternative reaction ways of the silicon monoxide, primarily reaction VI, are suppressed. As reaction VI is strongly exothermic an increased temperature has a negative influence on this reaction and raising the temperature might thus also here bring about a more complete formation of carbide. As the silicon monoxide reacts according to reaction V, essentially in the upper and cooler parts of the furnace, the possibilities of influencing the reaction temperature will depend on the entire energy balance in the furnace, above all on the ratio of the energy content in the rising gases to the heat capacity of the charge mateial as well as on the reaction rate between gas phase and solid phase.

However, studies have shown that, if the reaction temperature for the silicon conversion can be increased to such a value that essentially as much silicon monoxide is formed as carbide is consumed, the heat balance in the furnace will be such, that formation of silica according to reaction VI will be substantially reduced in favour of formation of silicon carbide from the silicon monoxide. This applies also, when a certain amount of carbon is present in the hotter part of the reactor, so that also reaction II will take place.

It is thus important to be able to influence the reaction temperature in the furnace, so that this can be raised relative to the temperature in today's furnaces. However, a substantial rise in temperature is difficult to obtain in practice. The reaction VII and VIII for silicon formation are strongly endothermic and the reaction rates will therefore increase very much, even at minor rises in temperature, whereby large amounts of energy are consumed and the temperature tends to drop to a lower value. When the reaction rate increases without a substantial rise in temperature, only more products of essentially the same equilibrium composition will be produced, which in an ordinary furnace means an increased production of silicon monoxide leaving the furnace too. This buffering effect, that the endothermic silicon formation reaction has on the temperature, is so strong, that an increased supply of energy in an ordinary furnace cannot be used to increase the temperature to any substantial extent. The same applies to the the measures suggested in the previously mentioned Swedish patent specifications to modify the charges and to separate carbon and quartz in the furnace. Compared with the increase in reaction speed, which is achieved also by small rises in temperature, the mass transfer across the volume of the grains of raw material or between different parts of the furnace at the reaction zone will be of such minor importance that the effect on the furnace process will be small.

To try to avoid these problems, it has been suggested to make the ratio of thermal energy supplied to the furnace to the amount of silicon oxide reciprocally adjustable and to set this so high, that the gas leaving the furnace has a reduced content of silicon monoxide.

By means of this production process the ideal furnace process, as indicated above, is approached. The measures mean, that the reaction temperature in the furnace is increased, so that a smaller amount of silicon monoxide is formed per mole of formed silicon, and so that the monoxide is more efficiently converted to carbide in the furnace. In this way the amount of carbon per unit charged silicon raw material can be increased without the risk of carbide build-up, which means fewer necessary shutdowns and better utilization of raw materials. The smoke losses will also be reduced, whereby the energy yield is considerably improved at the same time as the negative effects on the environment or the separation problems decrease. The improved conversion of silicon monoxide to carbide means less precipitation of quartz in the furnace top, which reduces bridge formation in the charge, reduces the number of electrode breaks, reduces the need for working of the charge and makes it possible to close the furnace, which is suitable for the recovery of the energy content in outgoing carbon monoxide gas, the reduction of environmental effects and the regulation of the air supply, and means, in general, a more continuous furnace process with improved control possibilities.

At production, the value for the mentioned ratio can in these cases either be set so low, that reducing agent is not constantly present in the hot zone for energy supply, but the reduction of the silicon raw material to silicon monoxide and silicon will instead occur essentially with silicon carbide, or it can be set so high that the silicon carbide content in the zone for energy supply is reduced to such an extent that the reducing agent is present in the hot zone for energy supply all the time and the reduction of the silicon raw material will thus to a certain part occur directly with the reducing agent. In the latter case, a small increase in yield can be obtained, as mentioned previously, but on the other hand there will be problems as there will be an essential temperature rise in the reactor.

The object of the present invention is to achieve a substantial increase in yield without the occurrence of substantial rises in temperature.

According to the invention this is achieved by making the ratio between the amount of thermal energy supplied to the furnace and the amount of silicon oxide supplied to the furnace adjustable in such a manner that a value for the ratio can be set within an interval, the lower limit of the interval being set by the lowest value which permits a constant reduction of the silicon oxide to silicon monoxide and silicon directly with a certain part of the reducing agent which is supplied to the zone of subsequent reaction because the amount of produced silicon monoxide is insufficient for complete conversion of all the carbonaceous reducing agent in the zone for subsequent reaction to silicon carbide and the upper limit of the interval being set by the highest value which permits constant reduction of the silicon oxide raw material to silicon monoxide and silicon directly with silicon carbide because the amount of produced silicon monoxide is sufficient to convert the carbonaceous reducing agent in the zone for subsequent reaction is silicon carbide, and that a sufficient content of reducing agent is maintained in the zone for energy supply in order that the reduction will to a certain extent take place directly with the reducing agent.

Electrode carbon, which is set free essentially only in the zone of energy supply, should in these cases not be considered as reducing agent in the zone of subsequent reaction.

The stated object is achieved by these means. Studies having surprisingly shown that within the given interval for energy/silicon supply a reduction furnace can be operated in two ways, namely on one hand in a conventional manner so that the reduction essentially takes place by means of silicon carbide at the bottom of the furnace and on the other hand in the manner that has been indicated above with a carbon containing furnace bottom and reduction, to a certain extent, directly with the reducing agent. Within this interval the operation conditions for the different cases thus show a hysteresis effect which makes selection of one or the other type of operation possible. It has further surprisingly been found that if the type of operation which comprises reduction of the silicon raw material by reducing agent is selected the yield will, in the entire interval, increase with decreased ratio of energy to silicon oxide and at the same time the temperature in the entire furnace will also decrease with decreased value for this supply ratio. These factors thus co-operate with the possibility to carry out the reaction as a combined direct and indirect reducing agent reduction to give higher yields without substantial temperature rises.

Other advantages and effects of the invention are evident from the detailed description of the invention which follows below and from the accompanying drawing.

By a furnace shall in this connection be understood a reaction zone comprising a zone for energy supply and a zone for subsequent reaction. At least the main part, and preferably the whole part, of the amount of energy required for the reduction of the silicon raw material with reducing agent to silicon as well as condensed phases from the zone of subsequent reaction are brought to the zone for energy supply. The silicon product and a gas phase, which is brought to the zone of subsequent reaction, are withdrawn from the zone of energy supply. In addition to the gas phase from the zone of energy supply, reducing agent is supplied to the zone of subsequent reaction. A gas phase product is withdrawn from the zone of subsequent reaction in addition to the condensed phases which are brought to the zone of energy supply. Silicon raw material in condensed form can be supplied to either of the subzones, but if it is in gas form it can only be supplied to the zone of energy supply. In a reduction furnace of this kind the silicon formation will take place essentially in the zone of energy supply while the formation of silicon carbide will occur essentially in the zone of subsequent reaction. In a common furnace the zone of energy supply corresponds to the area at the bottom of the furnace, immediately around the electrode tips, while the zone of subsequent reaction corresponds to the parts of the furnace which are higher up. There is no exactly defined or localized boundary between the zones and in the border area reaction, typical of both zones may occur.

Any silicon oxide containing material can in principle be used as silicon raw material. Pure silicon oxides are generally preferred as these do not add any other substances than silicon and oxygen to the process. Solid silicas, especially quartz, are particularly suitable as these can be obtained in a comparatively pure form.

Silicon monoxide can also be used in the reactor, but is then normally only an intermediate product in the process. Small amounts of e.g. naturally occurring silicates and aluminium oxides can be accepted with the silica without seriously impairing the purity of the final silicon product. Major amounts of cation containing silicates and oxides can only be accepted if demands on purity are not high. In the production of ferrosilicon iron, or iron oxide, is also added in a desired molar ratio with respect to the final product. Such an iron charge can be added together with the silicon raw material, by separate charge or together with the reducing agent to the zone of subsequent reaction. The latter method is preferred. Of course minor amounts of other raw materials can be added if other alloy elements in the final product are desired. The details in the process described below relate primarily to the preparation of essentially pure silicon from silica, the process being especially suitable for this purpose.

As reducing agent carbonaceous substances are preferred, e.g. organic materials such as wood chips or optionally available silicon carbide but preferably highly concentrated carbon materials, such as coke, black coal or charcoal and preferably fairly pure such materials.

The furnace process according to the invention will now be described more in detail with reference to the drawings which show a diagram of the yield and of the temperature at the top and the bottom of the furnace as a function of the ratio between supplied energy and supplied silicon oxide raw material. The conditions for the example according to the diagram are the following. The silicon raw material is pure quartz and the reducing agent is pure carbon. The carbon is supplied to the furnace top in a conventional manner while the quartz is charged directly to the zone of energy supply at the bottom of the furnace. The energy is supplied entirely to the zone of energy supply. As quartz and energy in this manner are supplied entirely independent of each other the supply ratio between them can be varied in any way. Charging of the silicon raw material to the bottom in this manner is preferred, but, as will be described more in detail below, carbon and quartz can be charged in a conventional manner at the top of the furnace and the essential process in the furnace will then be the same as if the components were supplied in a stoichiometric ratio of 2:1, the mentioned energy values will however be somewhat different. In the diagram the silicon yield is given in percent along the left vertical axis while the temperatures are given in degrees Kelvin along the vertical axis to the right. The horizontal axis gives the energy supply in kJ/mole quartz.

In the diagram there are graphs both for the carbide reduction case, i.e. the normal case of operation when carbon is not present to any appreciable extent at the lower hot reduction zone, and for the carbon reduction case, i.e. when carbon is present in the zone to some extent and works as a reducing agent. The graphs $Y_{SiC}$, $T_{SiC}$ and $t_{SiC}$ shown the yield, the bottom temperature and the top temperature respectively for the carbide reduction case. The graphs $Y_C$, $T_C$ and $t_C$ show the yield, the bottom temperature and the top temperature respectively for the carbon reduction case. The broken lines A and B show respectively the lower and upper limits between which both operating cases are possible. To elucidate the meaning of the graphs in the diagram a starting point can be selected to the left of the line A in the drawing. Here only carbide reduction is possible.

If the energy supply is increased from this point, the top and bottom temperatures will only increase slowly along the graphs $t_{SiC}$ and $T_{SiC}$ while the yield will increase considerably along the graph $Y_{SiC}$ as a consequence of the highly endothermic character of the silicon formation reaction. The progress can continue on to the broken line B. Above this point in energy supply the production of silicon monoxide is so low that its conversion to carbide is no longer sufficient to maintain a carbide reduction condition. Carbon will then penetrate down into the bottom of the furnace and cause a strongly, step-formed, increase in content of carbon and carbon reduction condition is hereby obtained and this condition is the only possible one at a supply of energy corresponding to values above those at the vertical line B. As a reduction with carbon is substantially less endothermic than reduction with carbide the temperature at the bottom according to graph $T_C$ will increase at the transition and the temperature at the top will decrease according to graph $t_C$ and the yield according to graph $Y_C$ will also be less strongly dependent on energy changes. The slope of the graph $Y_C$ is reversed with respect to that of the graph $Y_{SiC}$ and the yield will decrease slowly when the energy supply is increased, while also can be explained by the following: the moderate reduction of the production of silicon monoxide which is obtained at an increased energy supply is not sufficient to compensate for the increased partial pressure of the gas obtained at the top of the furnace due to the increase in temperature there. If the energy supply is decreased from the point at line B in direction towards the left of the diagram an immediate change-over to carbide reduction will not occur but the carbon reduction will instead be maintained according to the graphs $Y_C$, $T_C$ and $t_C$. This can be explained in the following manner: the silicon monoxide production is certainly increased at decreased energy supply but it is still low and as the temperature now is higher a sufficient accumulation of carbide according to reaction V will not be obtained in the furnace so that a transition to carbide reduction will be possible. It is possible to reduce the energy supply up to the broken vertical graph A in the diagram. Below this energy supply the temperature in the reactor will be so low that a sufficient accumulation of carbide for transition to carbide reduction will occur and the yield will be drastically impaired.

It is thus possible to increase the yield without considerable rises in temperature if the energy supply is within the hysteresis-interval that corresponds to the area between the lines A and B in the diagram and if care is taken that carbon reduction is maintained. The invention hereby takes advantage firstly of the fact that the yield graph $Y_C$ rises with decreasing temperature, and secondly of the fact that the temperature graphs $T_C$ and $t_C$ fall with decreasing temperature and thirdly of the possibility of chosing reduction mechanism within the hysteresis-range. At operation it is suitable to work in the lower half of the interval with respect to energy, preferably at the lowest tenth of the interval and most preferably as near the value at the line A as is possible with respect to a stable operation.

It is required according to the invention that a carbon reduction actually takes place in the reactor. Several methods can be used to reach this operating condition. Before start-up the reactor can be filled with reducing agent as far as to the bottom and then directly be brought up to the desired energy value in the interval. Alternatively it is possible to work in the way described above with reference to the diagram, i.e. to increase the energy supply to a reactor working with carbide reduction to a point above the line B, awaiting a carbon reduction process and then lowering the energy supply to the desired value within the interval. It is also possible to combine the methods in different ways.

The energy supply per charged amount of silicon oxide is the most important control parameter for influencing the furnace process. The amount of energy to be supplied to the reaction zone per mole of charged silica depends, besides on what is theoretically required for the reaction and for maintaining the energy balance in the reactor, also on losses from the reaction zone to the environment and on optional moisture or other energy consuming substances in the raw materials. Such factors can vary substantially in different processes and thus no general values for the energy consumption can be given. The energy values according to the diagram are thus idealized and they will normally be higher in practice. At the idealized conditions the hysteresis-effects are according to the diagram obtained between about 889,5 and 914,5 kJ/mole $SiO_2$. These values are, as has been mentioned previously, only valid at bottom charging of quartz. If both quartz and carbon are charged at the top or if carbon is charged at the bottom somewhat different values will be obtained. The fundamental behaviour will, however, be the same. The temperatures given in the diagram are also idealized as they correspond to the equilibrium value for the substances in the zone. There can be considerable differences in temperature in the zone without it being necessary to consider them when assessing the whole of the furnace process. At the electric arcs the temperature can e.g. be several thousands degrees above the equilibrium temperature. After calibration for each type of furnace the energy supply to the furnace per amount of charged silicon raw material can be used as the main control parameter. It is easy to determine it and it is independent on local systematic and occasional variations as far as energy and composition in the reactor are concerned and adjusting this ratio to a suitable value gives a result which to an essential extent is independent on the method of charging and possible excess of carbon in the charge.

The content of silicon monoxide in the gas at the furnace top is particularly suitable as a general measure of the furnace process according to the above given criteria and for calibration of the energy supply parameter at this content, at the top, is satisfactorily stabilized and fairly independent of charge-height, carbon excess and minor variations in temperature at the top. Even if the temperature in the reaction zone is an important process parameter, in accordance with what has been discussed above, it is difficult to control the furnace operation by this, as it is difficult to measure and also as it varies throughout the furnace and also, to some extent, locally in the reaction zone. Nor is the chemical composition of the reaction components in the reaction zone a suitable control parameter for the cell, as this, even if it would be easy to establish, can vary widely and furthermore can be far from the theoretical chemical equilibrium composition although the combined chemical and thermal equilibrium is very good. This is again a consequence of the strongly endothermic silicon formation reaction, due to which even minor variations in temperature rapidly can bring the equilibrium conposition far from the existing composition, although the final composition may be very stable.

On account of the equilibrium conditions for the gas phase composition relative to the solid phase in a reaction zone of the above type, there will always be a certain amount of silicon monoxide present in the gas phase when this leaves the reaction zone. For ordinary silicon furnaces the content is generally between 5 and 10 mole percent. Even when the ratio of energy to silicon oxide is very satisfactorily controlled contents below about 1.5 mole percent are not obtained. Substantially lower contents can be obtained by the process of the present invention and the value suitably does not exceed 1 mole percent. The content is preferably below 0.5 mole percent. The lowest content possible to obtain is essentially dependent on the temperature at the furnace top, which in turn depends on the height of the furnace, the composition of the charge and optional cooling measures. Cooler flue gases give a lower silicon monoxide content but also involves the risk of precipitation of silicon oxide in the charge. The content of silicon monoxide in flue gases can thus be brought to a very low level, by cooling measures, e.g. indirect cooling or direct cooling by water sprinkling or by supplying materials which can be pyrolysed, such as wood chips, if precipitation of silicon dioxide can be accepted. However, content of silicon monoxide shall in this connection be understood as the content which is not influenced of optional additional cooling- or oxidation measures taken in order to retain the silicon monoxide in the form of silica and silicon carbide at the top of the reactor. As silicon dioxide is precipitated at temperatures below 1750° to 1900° K. the stated contents thus relate to the composition of a gas, in contact with reducing agents, having a temperature above the temperature limits for precipitation. Only such parts are considered as belonging to the reaction zone of the furnace. At these conditions the lowest practical content will be fairly independent of the furnace height and of the composition of the charge and it will for practical reactors suitably be above 0.01 mole percent and preferably above 0.05 mole percent. Too low values lead to low temperature at the top and sensitive operation. The statement of contents relate to values at steady state in the furnace and if there are greater variations in the furnace process they relate to time-average values.

The silicon monoxide content at the top can also be used to establish whether the furnace operates with carbon reduction or carbide reduction. A low silicon yield is indicated mainly by a high amount of silicon monoxide leaving the top, while a good yield gives a low content at the top. Within the entire given hysteresis-interval a transition between the two kinds of operation can thus be registered as change in the silicon monoxide content at constant energy supply. This change is small in the upper part of the interval, as is evident from the diagram, but it increases rapidly towards the lower limit and is at energy values suitable for operation so great that it can easily be established. It should be pointed out that the diagram shows the situation is steady state and that considerable operation times can be required before a new stable operation level is achieved after a change in operation conditions. Another, and a preferred, manner for determining whether the furnace operates with carbon reduction or carbide reduction is to measure and compare the temperatures at the top and the bottom of the furnace. As shown in the diagram the curves for the top- and bottom-temperatures at carbide reduction, $t_{SiC}$ and $T_{SiC}$ respectively, are very close to each other, while the corresponding curves for the carbon reduction, $t_C$ and $T_C$ respectively, are considerably further apart. A great difference in temperature between top and bottom thus indicates carbon reduction while a small difference indicates carbide reduction. The differences are so great in the entire hysteresis interval that it is easy to establish whether the furnace operates with carbon- or carbide reduction from measurements of top- and bottom temperatures. As it, as has been mentioned above, is difficult to measure the temperature in the furnace, it is suitable to measure the bottom temperature on the liquid silicon discharged from the furnace. The top-temperature shall, of course, be measured where it, as has been discussed previously, is independent of other means for cooling than the charging of the raw materials. If the operation conditions are changed, it is, of course, also for these kinds of measurements necessary to wait some time until a new stable temperature level is rearched.

The ratio between charged amount of carbon and charged amount of silicon dioxide, expressed in moles, is important in order to obtain a low level of leaving silicon monoxide. This value is, as has been mentioned, normally not above 1.8 but according to the invention it should be about 2. When the silicon oxide is charged at the bottom the consumption of reducing agent will not be directly controllable but a consequence of the furnace operation. When calculating the carbon charge the amount of carbon which is added by the consumption of the carbon electrodes, normally about 10 percent of the entire amount of carbon, should be included.

The amount of charge material in the reaction zone should be so large that a further increase of the charge height should not substantially influence the composition of the top-gases. A suitable height according to the invention is about the same height as for previous furnaces.

The pressure in the reaction zone can be above atmospheric, as this increases the reaction rates and makes the process more efficient, but the practical problems are of such a kind that it is preferred to carry out the reaction at atmospheric pressure.

Inert gas can be supplied to the reaction zone, preferably the zone of energy supply, e.g. for charging or for improved control of the process. Inert gas will, however, impair the efficiency and energy economy of the process as the above given energy values increase and large amounts of inert gas should thus not be supplied. Optional inert gas suitably consists of carbon monoxide and this is preferably taken from the process itself.

According to what has been said above an improved possibility of adjusting the supply of energy to the supply of silicon dioxide, compared with the furnaces of today in which the material of carbon and quartz quite simply fall down into the hotter parts as the material therein is comsumed, is required in order to obtain a satisfactory supply of energy. The energy supply can be favourably influenced if a quartz material, which melts and decomposes more slowly, is supplied to such a conventional furnace. It is, however, as has been mentioned, difficult to achieve any substantial improvements in this manner. Another way of using conventional furnace for the object of the present invention is to charge silicon raw material which reacts more slowly, e.g. by supplying Al, Ca or Fe to the charge, but this will contaminate the final product. Evidently it is difficult to influence the energy control favourably in a conventional furnace.

It is consequently preferred that the flow of at least some part of the silica to the zone of energy supply is made independent of the energy supply to the zone and is supplied to the zone in a controlled manner. One way of accomplishing this, with maintained top-charging of the entire flow on the raw material, is to divide the reaction zone between the zone of energy supply and the zone of subsequent reaction and make the connection such that the flow of condensed phases from the zone of subsequent reaction to the zone of energy supply can be adjusted, preferably by means of connection which can be mechanically controlled. In practice this can be carried out by insertion of a partition wall between the hotter parts at the bottom of the furnace and the cooler parts at the top of the furnace and designing the partition wall so that the flow therethrough of at least the condensed phases but preferably also the gas flow, can be controlled from the outside of the furnace, e.g. as a bottom with an adjustable opening to the bottom of the furnace. The same purpose can be achieved by making the furnace comprise at least two separate parts, whereby the condensed phases are brought to the zone of energy supply by means of a mechanical conveyance device, preferably a lock between two furnaces positioned above each other. The gas can in this case be transported through another connection or, preferably, through the same connection.

It is, however, preferred that at least a part of the silicon raw material to be charged to the furnace is not supplied to the zone of subsequent reaction, but instead to the zone of energy supply, possibly via a transport section through the zone of subsequent reaction to obtain heat exchange without contact with the material there. Direct charging to the zone of energy supply leads to improved control possibilities in a fairly simple manner. Interference with the material transport in the hotter parts of the furnace can be avoided and the supply of the silicon raw material can, in addition to being independent of the energy supply, be made independent of the addition of reducing agent. By bottom charging the amount of material in the zone of subsequent reaction, and thereby the heat capacity, is also reduced. This leads to a higher temperature and a reduced risk of silica precipitation, although the silicon monoxide content in the gas phase is increased. The degree of bottom charging can thus be used as a means for balancing these factors with respect to each other and it can e.g. be selected to give the smallest content of silicon monoxide without risks of precipitation. It is of course also necessary to consider practical factors and control factors.

In order to achieve an efficient control at least 33 percent of the silicon raw material should be charged directly to the zone of energy supply and preferably at least 70 percent and most preferably the entire amount of silicon raw material is charged in this manner. Part of the recucing agent can also be charged to the zone of energy supply but in that case the amount should not exceed the stoichiometrically required amount for conversion of silica to silicon monoxide, i.e. about half of the amount of reducing agent, while the rest is charged to the zone of subsequent reaction. It is, however, preferred that no carbon is charged at the bottom. When part of the reducing agent is charged to the zone of energy supply care should be taken that it is not charged in such a manner that it will directly come in contact with liquid elementary silicon as carbide will then be formed according to reaction IV and the efficiency of the process will be reduced. Material which in an ordinary manner is charged to the zone of subsequent reaction consists of normal charging material.

In order to obtain the desired improved control possibilities it must be possible to regulate the supply of silicon raw material to the zone of energy supply evenly and substantially continuously. An intermittent supply or a supply of large batches or pieces often results in violent formation of silicon monoxide and this counteracts the maintenance of the right temperature for formation of correct proportions between this gas and elementary silicon, as discussed above. It might also result in a violent increase of temperature which may damage parts of the furnace. If the particles are fairly large, e.g. between 1 and 100 mm and especially between 10 and 50 mm, it is suitable to supply the material by means of some kind of mechanical lock, particularly screws, to obtain a uniform supply. A more uniform supply is obtained if the part which is charged to the zone of energy supply is in the form of a gas, a liquid or a powder. For practical reasons raw material in the form of powder is preferred. To obtain a uniform supply of powder it is preferred that is blown in by means of a gas stream and the powder must then be sufficiently finely divided to be carried by the gas stream. With respect to these factors, and also with respect to the melting rate and thereby the risk of tackiness, as will be discussed, the particle size should be between 0.05 mm and 10 mm and preferably between 0.1 and 1 mm. Carbon monoxide, which already is present in the reaction zone and which advantageously can be separated from the gas which leaves the reaction zone, is a suitable auxiliary gas. As great amounts of inert gas should not be supplied to the furnace, more than 0.1 $Nm^3$ gas, per kilo charged powder, should not be added and preferably not more than 0.02 $Nm^3$. To avoid deposits the amount should exceed 0.001 $Nm^3$ and preferably exceed 0.005 $Nm^3$. A transport channel ending in the zone of energy supply is required for supply according to this pattern. In this case there is a risk that silicon raw material is deposited in the channel due to partial melting and it is consequently suitable to take measures to keep the channel free from such deposits. This can be done by heating the entire channel to a temperature above the melting point of the silicon raw material, either by direct heating of the channel or by heating the gases in the channel. Heating the gases is simple and thus preferred. Even if it is possible to heat, by means of conventional heating devices, the whole stream of auxiliary gas continuously to a suitable temperature for keeping the channel clean, which heating would then suitably be carried out before the particle material is supplied, it is preferred that charging is carried out by means of a gas stream which is not heated and that cleaning is carried out periodically, preferably by means of a separate gas stream which is heated to a high temperature, preferably by means of a plasma burner. Periodical cleaning when necessary and high temperature of the gas stream is advantageous in that a smaller total amount of inert gas flow is supplied to the reaction zone which reduces the influence on the process. The hot gas stream can either be conveyed through the supply channel in the same way as the charging material or it can be directed particularly towards those parts where deposits tend to accumulate. A directed stream can most simply be achieved if the supply channel is arranged in the form of a hole through the wall of the furnace which hole preferably ends in the furnace on a level with the electrode tips, whereby another hole can be arranged for the gas stream, which shall be led through the plasma burner, and be directed to areas where the build-up risks are great. Holes through the furnace wall for supply are preferred as they sustain the furnace environment better and offer smaller deposit risk areas than other alternatives do, particularly such where the supply is carried out by a channel through the charge. Should, despite this, supply through the charge be desired, e.g. for reasons of preheating, charging via the electrodes is preferred to other alternatives such as lances or partition walls in the furnace. Plasma burners can of course also advantageously be used when the separate gas stream is hot heated, but instead the auxiliary gas stream itself. When calculating the amount of energy to be supplied to the zone of energy supply, the energy supplied by the plasma burner, or otherwise with the flows of raw material, should of course be considered.

I claim:

1. A process for the preparation of silicon or ferrosilicon by reduction of silicon oxide in the form of silicas or cation containing silicates and oxides, optionally in the presence of iron or iron oxide, using a carbonaceous reducing agent in a reaction zone which reaction zone comprises an energy supply zone and,
a subsequent reaction zone, whereby
at least heat energy and condensed phases from the subsequent reaction zone are brought to the reentry supply zone,
while elementary silicon and a gas phase are leaving the energy supply zone, and whereby
at least the carbonaceous reducing agent and the gas phase leaving the energy supply zone are brought to the zone of subsequent reaction,
while a gas leaves the zone of subsequent reaction, and
condensed phases enter the energy supply zone, whereby
at least 33% of the silicon oxide material is fed directly into the energy supply zone,
so that the supply rate of the silicon oxide to the energy supply zone can be controlled independent of the charging of energy to the energy supply zone,
so that the temperature in the energy supply zone can be influenced, and
regulating the supply rates of silicon oxide and energy to give a low content of silicon monoxide in the gas leaving the zone of subsequent reaction,
the improvement comprising
(a) awaiting and securing a carbon reduction mode in the reaction zone
to obtain a greater difference in temperature between the gases leaving the zone of subsequent reaction and the silicon product than at carbide reduction,
by filling reducing agent in the energy supply zone before start up and directly applying an energy to silicon oxide charging ratio within the interval stated in (b), or
by altering a carbide reduction mode into a carbon reduction mode by use of an energy to silicon oxide charging ratio above the interval stated in (b), and
(b) after securing carbon reduction according to step (a)
supplying the energy and the silicon oxide in a ratio within an interval, the lower limit of said interval being defined by the lowest value permitting a constant carbon reduction, and the upper limit of said interval being defined by the highest value permitting a constant carbide reduction, whereby the gas leaving the zone of subsequent reaction has a silicon monoxide content below 1.5 mole percent.

2. A process according to claim 1 wherein the ratio of supplied energy to supplied amount of silicon oxide is set at a value between 0 and 50 percent of the entire interval.

3. A process according to claim 2 wherein the value is set between 0 and 10 percent of the entire interval.

4. A process according to claim 3 wherein the value is set at the lower end of the interval.

5. A process according to claim 1 wherein a carbon reduction mode is achieved by feeding energy and silicon oxide with a ratio in the desired interval directly to a reaction zone containing reducing agent in the zone of energy supply.

6. A process according to claim 1 wherein a carbon reduction mode is achieved by supplying energy and silicon oxide raw material in a ratio of at least the upper value of the interval until the reduction of the silicon oxide raw material to silicon monoxide takes place directly with a certain part of the reducing agent and that the ratio then is adjusted to value within the interval.

7. A process according to claim 1 wherein the difference in temperature is determined by measurements on the elementary silicon leaving the zone of energy supply and on the gas leaving the zone of subsequent reaction respectively.

8. A process according to claim 1 wherein the silicon oxide raw material is supplied directly to the zone of energy supply.

9. A process according to claim 1 wherein the content of silicon monoxide in the gas leaving the zone of subsequent reaction is between 0.01 and 1 mole percent.

* * * * *